May 7, 1940. C. K. ELLIOTT 2,199,880
HYDRAULIC SHOCK ABSORBER
Filed Dec. 20, 1939 2 Sheets-Sheet 1
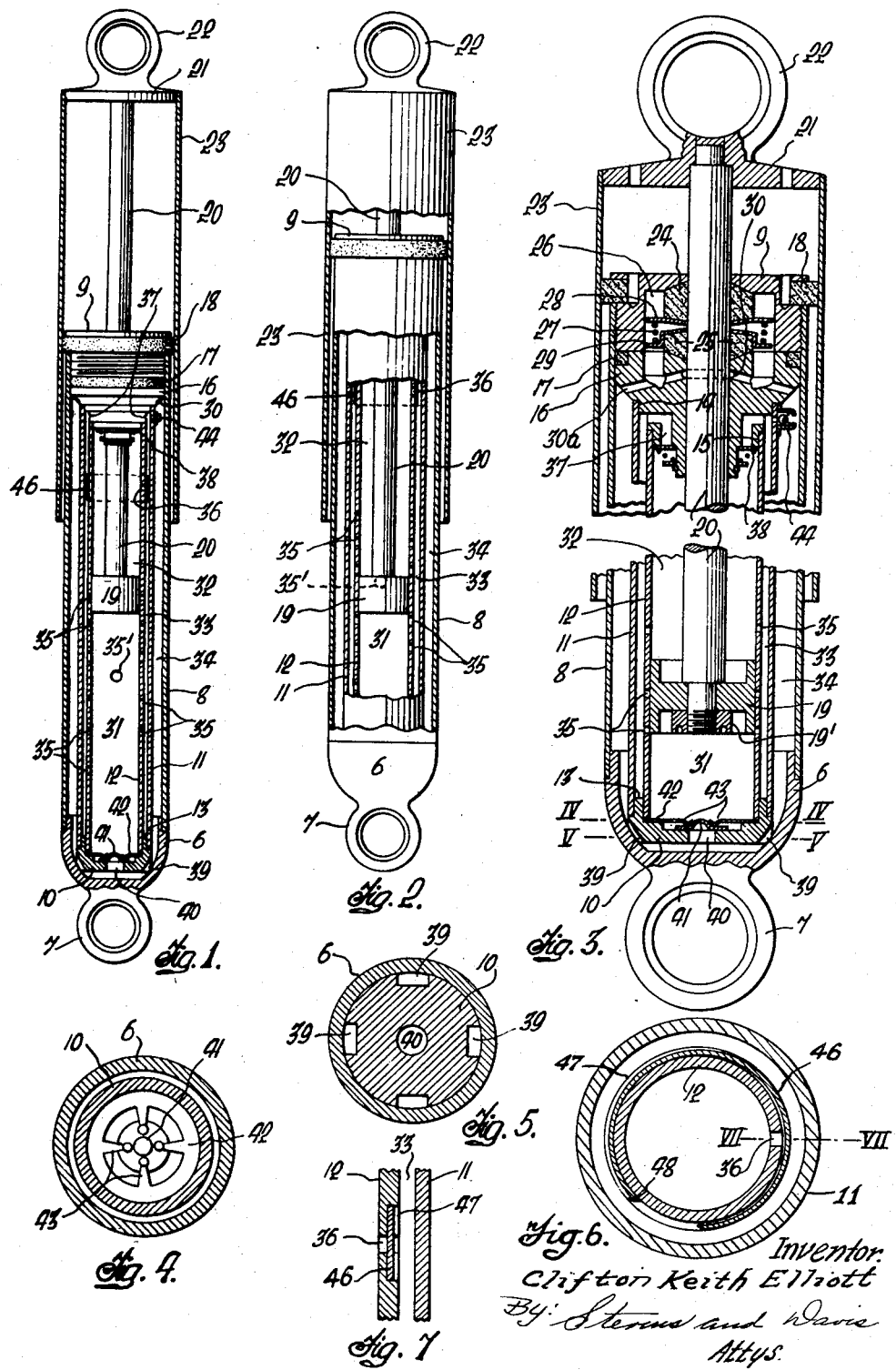
Inventor:
Clifton Keith Elliott
By Sterns and Davis
Attys.

May 7, 1940.  C. K. ELLIOTT  2,199,880
HYDRAULIC SHOCK ABSORBER
Filed Dec. 20, 1939   2 Sheets-Sheet 2

Inventor
C. K. Elliott
By Stevens and Davis
Attorneys

Patented May 7, 1940

2,199,880

UNITED STATES PATENT OFFICE 2,199,880

HYDRAULIC SHOCK ABSORBER

Clifton Keith Elliott, Bellvue Hill, New South Wales, Australia

Application December 20, 1939, Serial No. 310,243
In Australia October 17, 1938

5 Claims. (Cl. 188—88)

This invention relates to hydraulic shock absorbers of the telescopic tube type, for use on motor vehicles and the like in order to control the compression and rebound flexure of the suspension springs of the vehicle. In shock absorbers of this type the flow of oil or other hydraulic fluid from a compression chamber to a rebound chamber, and the reverse flow, controls the said flexure of the springs.

A disability of previous shock absorbers of this type is that in actual practice they do not ensure a sufficiently large and free initial flow of the oil from one chamber to the other. My investigations have demonstrated that a free and substantial initial flow during the first part of the compressive movement of the shock absorber is necessary or at least highly desirable in order to give a "soft" initial regulation so that the suspension springs are not hindered from fulfilling their normal function of absorbing minor shocks.

The principal object of this invention is, therefore, to make provision, in a shock absorber of the type indicated, whereby a greatly increased and entirely adequate initial flow of oil from the compression chamber to the rebound chamber is ensured so that a more efficient shock absorbing action is obtainable.

A further object is to improve the operation and construction of shock absorbers of the type indicated in other respects as will be fully described and ascertained hereinafter.

A preferred form of the invention is illustrated in the accompanying drawings in which:

Figure 1 is a longitudinal cross-sectional elevation of the shock absorber in the inoperative (normal) position.

Figure 2 is a similar view, but partly in cross-section, of the shock absorber in the partially compressed position.

Figure 3 is a broken longitudinal cross-sectional elevation, on an enlarged scale, showing the shock absorber in the fully compressed position.

Figure 4 is a cross-sectional plan view on line IV—IV of Figure 3, and

Figure 5 is a cross-sectional plan view on line V—V of Figure 3.

Figure 6 is an enlarged cross-section of a cylinder showing a port and a leaky valve associated therewith.

Figure 7 is a section on line VII—VII of Figure 6.

Figure 8:
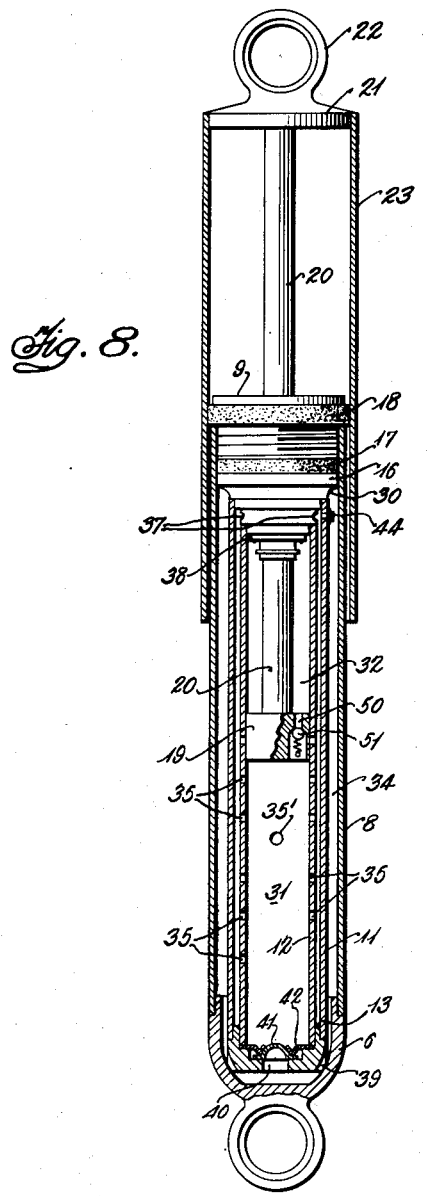
Figure 8 is a view similar to Figure 1 but showing a modification of the piston structure.

According to the embodiment illustrated, the device includes a base cap 6 having an eye 7 for attachment to the axle or other appropriate part of a vehicle or the like. An outer tube 8 is secured, as by welding, at its lower end to cap 6, and is internally screw threaded at its upper end (see particularly Figure 3) to receive a nut 9.

A lower cylinder head 10 seats within cap 6, while an intermediate tube 11 and a cylinder tube 12 are pressed respectively over and into an annular flange 13 upstanding from head 10. The upper ends of tubes 11 and 12 respectively are pressed around flanges 14 and 15 formed on an upper cylinder head 16, the upper surface of which is engaged by nut 9. Thus, when nut 9 is tightened into position, the tubes 8, 11 and 12 and the lower and upper heads 10 and 16 are locked together so as to form a unitary structure.

A ring gasket 17 is shown disposed in a recess formed in the upper face of head 16, and a dust excluding ring 18 is shown nipped between the upper end of outer tube 8 and an annular recess in nut 9.

A piston 19, slidable in cylinder 12, is secured by a nut 19¹ on the lower end of a piston rod 20 which passes through nut 9 and upper head 16 and which, at its upper end, is attached to a flange 21 formed on an upper eye 22 that may be secured to the chassis or other appropriate part of the vehicle or the like. A dust cover tube 23 is welded or similarly secured to flange 21 and extends downwardly around dust ring 18 and the upper part of the outer tube 8.

It will therefore be observed that the structure referred to provides two mutually telescopic units, one unit being constituted by the base cap 6, tubes 8, 11 and 12, heads 10 and 16 and nut 9, whilst the other unit is constituted by flange 21, dust cover 23, piston rod 20 and piston 19.

Two longitudinally spaced and tapered gland packings 24 and 25 are shown disposed about piston rod 20 in a gland chamber 26 formed within head 16 and nut 9, and these packings are compressed by a coil spring 27 extending between two sliding rings 28 and 29 that are disposed about rod 20 and engage the respective packings. By means of spring 27 the packings 24 and 25 are maintained in tight condition about rod 20. Gland chamber 26 may be advantageously drained of any oil that may leak into it along rod 20, by annular groove 30 and drainways 30a formed through head 16 and leading to the annular space between outer and intermediate tubes 8, 11. By this means the gland is relieved of any pressure from the rebound chamber, and any film of oil on rod 20 is broken down by the groove 30.

Piston 19, in effect, divides cylinder 12 into two chambers, namely a compression chamber 31 below the piston and a rebound chamber 32 above the piston. The volumes of these chambers vary with movement of the piston, one increasing as the other decreases. The annular space 33 between the cylinder 12 and intermediate tube 11 may be conveniently termed a "transfer" chamber, while the space 34 between the outer and intermediate tubes 8 and 11 may be termed the "reservoir" chamber.

As seen in Figure 1, cylinder 12 is provided at opposite points with series of longitudinally spaced apertures 35. A relatively large aperture 35¹ may be formed intermediate the series of apertures 35.

Towards its upper end the cylinder may be provided with a cut-off or maximum rebound port 36.

Oil flow from the transfer chamber 33 to the rebound chamber 32, during descent of the piston 19, may take place through oilways 37 formed in upper cylinder head 16 and controlled by a one-way, spring loaded, disc valve 38. Passages 39 (see Figures 3 and 5) are formed through lower cylinder head 10 to permit oil flow from reservoir chamber 34 to the space below cylinder head 10 which is also provided with a port 40 controlled by a one-way flap valve 41. A spider 42 (Figures 3 and 4) nipped at its circumference between cylinder tube 12 and head 10, has arms 43, which locate valve 41 over port 40 and lightly press the valve onto its seat. During ascent of piston 19, oil may flow from reservoir 34, and through port 40 into the compression chamber 31. A spring-loaded relief valve 44 is associated with a port through the intermediate tube 11 to permit flow of excess oil from the transfer chamber 33 to the reservoir 34.

The operation of the shock absorber is as follows: In the normal (inoperative) position as shown in Figure 1, all chambers, with the possible exception of reservoir chamber 34, are full of oil. When the suspension spring of the vehicle or the like moves upwardly in relation to the chassis, the two units of the shock absorber are telescoped, and piston 19 moves downwardly in relation to cylinder 12, thus forcing oil from compression chamber 31 through apertures 35 below the piston, into the transfer chamber 33. A negative pressure is established in rebound chamber 32, and valve 38 is drawn open to admit oil into this chamber from transfer chamber 33, through oilways 37. As piston 19 passes below some of the apertures 35 in the upper part of cylinder 12, oil flows through such apertures from the transfer chamber 33 into the rebound chamber 32.

Owing to the presence of the piston rod 20 in the rebound chamber 32 the effective capacity thereof is less than that of compression chamber 31, and excess oil forced from the compression chamber into the transfer chamber is bypassed through relief valve 44 into reservoir chamber 34. When piston 19 has covered the lowest of the apertures 35 in cylinder 12, continued movement of the piston is arrested by the body of oil trapped in the lower end of compression chamber 31, which prevents metal-to-metal contact.

When compression movement of the shock absorber has ceased, the vehicle spring exerts its rebound force to move the vehicle chassis upwardly in relation to the axle, thereby commencing the extension movement of the shock absorber, which results in an upward movement of the piston 19 in cylinder 12. During such upward movement of the piston 19, valve 38 closes, and oil is forced from rebound chamber 32, through apertures 35 into the transfer chamber 33. A negative pressure is established in the compression chamber 31, and valve 41 is drawn off its seat to permit oil to flow from reservoir chamber 34 into compression chamber 31. As the piston 19 passes above some of the apertures 35 in the lower part of cylinder 12, oil also flows through these apertures from the rebound chamber via transfer chamber 33 into the compression chamber 31. When and if piston 19 covers cut-off port 36, further upward movement of the piston is cushioned and halted by the body of oil trapped in the upper end of rebound chamber 32.

It will be observed that during the compression movement of the piston 19, escape of oil from compression chamber 31 can take place only by way of those apertures 35 at the moment below the piston, and that the number of such apertures progressively decreases with descent of the piston, thereby progressively increasing the resistance to movement throughout such movement. Similarly, a progressively increasing resistance is offered to rebound movement.

It will also be observed that the relatively large surface area of the cylinder 12 permits the provision of a large number (or area) of escape apertures 35, and that as a consequence it is possible to provide for a substantial flow of oil from the compression chamber through the transfer chamber to the rebound chamber during the initial or early compressive movement of the piston, thereby giving the desirable "soft" regulation for small displacement. The substantial volume or capacity of the transfer chamber 33 assists in achieving this result.

Furthermore, it will be seen that the structure thus provides for a relatively quick return from a fully compressed condition to a normal condition accompanied by increasing resistance, while high resistance is imposed against any rebound movement beyond a normal position.

Generally speaking, the resistance to rebound from normal position is governed by the area of port 36 and the speed at which the piston travels upwardly during rebound, which is relatively high when the piston is returning from a fully compressed position as compared with a partly compressed position. Consequently, if the area of escape through port 36 remains constant under all conditions of operation, the resistance to rebound would either be too great during the quick return of the piston from a fully compressed condition, or too small during the slower return of the piston from a partially compressed position.

To meet this situation, the effective area of escape through port 36 is such as will provide the desired relatively slight resistance to rebound when the piston is moving at high speed from a fully compressed position, and provision is made for automatically decreasing the effective area of escape through port 36 proportionally with slower rebound movement of the piston from a lesser compressed position.

Thus, as seen in Figures 6 and 7 a static or a spring valve is associated with port 36, this valve consisting of a spring steel band 46 of arcuate shape adapted to be sprung into a groove 47 formed around the exterior of cylinder 12. One end of the band is made fast to the cylinder as by being welded or soldered as at 48, while the other end is free. The intermediate portion of the band extends over port 36. During relatively high speed rebound movement of the piston, the pressure and velocity of the oil displaced thereby is sufficient to overcome the port closing influence of the band 46 and thus allow substantially unrestricted flow of oil through the port 36. With a fall in pressure and velocity due to slower travel of the piston when it is returning from a partially compressed position, the band 46 increasingly restricts the effective escape area.

According to an alternative which is less expensive than the arrangement of Figures 6 and 7 while equally effective, port 36 is replaced by a port 50 extending through the piston 19 and such port is controlled by a spring pressed valve 51, the arrangement being such that the port remains closed except when the piston is moving upwardly on its rebound stroke beyond the uppermost of the apertures 35. (See Figure 8.) Thereupon the spring pressure maintaining the valve closed is overcome by the pressure within the rebound chamber so that fluid may pass from that chamber through the piston port to the compression chamber.

Various modifications may be made in the above-described preferred form of the invention without departing from the spirit thereof as defined by the appended claims. For instance, the size, number or disposition of the escape apertures 35 may be varied.

The essential construction above described in connection with direct-acting shock absorbers may also be applied to lever type shock absorbers.

It is also to be understood that the shock absorbers may be applied to the landing wheels of aeroplanes as well as to motor vehicles and that wherever the term "vehicle" is employed in the appended claims, it is intended to embrace aeroplanes.

Having now described my invention what I claim as new and desire to secure by Letters Patent is:

1. An hydraulic shock absorber including a cylinder, a piston reciprocal therein and dividing said cylinder into a compression chamber and a rebound chamber, a tube surrounding said cylinder and forming a transfer chamber, means of direct communication between said transfer chamber and said other two chambers, said means of communication passing through the wall of said cylinder and extending from a medial point in the length thereof to a position adjacent the outer end of said compression chamber, valve controlled means permitting fluid to flow from said transfer chamber into the rebound chamber when the piston is displacing fluid from said compression chamber, and valve controlled means permitting fluid to flow from said rebound chamber into said transfer chamber when the piston is moving on its rebound stroke beyond its normal position.

2. An hydraulic shock absorber comprising two telescopic units adapted to be secured respectively to relatively movable parts of a vehicle, one of said units including a cylinder, an annular transfer chamber disposed exteriorly thereabouts, and an annular reservoir chamber disposed exteriorly about said transfer chamber, the other of said units including a piston slidable in said cylinder and mounted on a piston rod, the piston sub-dividing the cylinder into a compression chamber and a rebound chamber, means of direct communication between said transfer chamber and said other two chambers, said means of communication passing through the wall of said cylinder and extending from a medial point of the length thereof to a position adjacent the outer end of said compression chamber, to permit the flow of hydraulic fluid from the compression chamber through the transfer chamber into the rebound chamber, and vice versa, according to reciprocating movement of the piston in the cylinder, and one-way valves adapted to control communication between the transfer chamber and the rebound chamber and between the compression chamber and the reservoir chamber in order to permit hydraulic fluid to flow into the rebound chamber or into the compression chamber during the displacement of oil from the other of said chambers.

3. An hydraulic shock absorber as claimed in claim 2 and including means of communication between said transfer chamber and said reservoir chamber, and a one-way valve associated with said means in order to permit the escape of excess hydraulic fluid from the compression chamber through the transfer chamber to said reservoir chamber.

4. A hydraulic shock absorber including a cylinder, a piston reciprocal therein and dividing said cylinder into a compression chamber and a rebound chamber, a transfer chamber disposed externally of said cylinder, means of direct communication between said transfer chamber and said other two chambers, said means of communication passing through the wall of said cylinder and extending from a medial point in the length thereof to a position adjacent the outer end of said compression chamber and being covered and uncovered by the piston during its reciprocating movements, a port in said cylinder establishing communication between said rebound chamber and said transfer chamber, the area of said port being such as will provide for escape of fluid from the rebound chamber at a rate offering a predetermined resistance to rebound when the piston is returning at relatively high speed from a substantially fully compressed position, and a resilient device associated with said port to automatically decrease the effective escape area thereof and to increase the resistance to rebound in proportion to a slower rate of rebound movement from a lesser compressed position.

5. A hydraulic shock absorber as claimed in claim 2, including a port in the piston establishing communication between the compression chamber and the rebound chamber, and a spring pressed check valve associated with said port and adapted to open when the piston is moving on its rebound stroke beyond its normal position, thereby to enable fluid to pass from the rebound chamber into the compression chamber.

CLIFTON KEITH ELLIOTT.